No. 818,604. PATENTED APR. 24, 1906.
R. E. BIERD.
PUNCHING BAG SUPPORT.
APPLICATION FILED MAY 11, 1905.
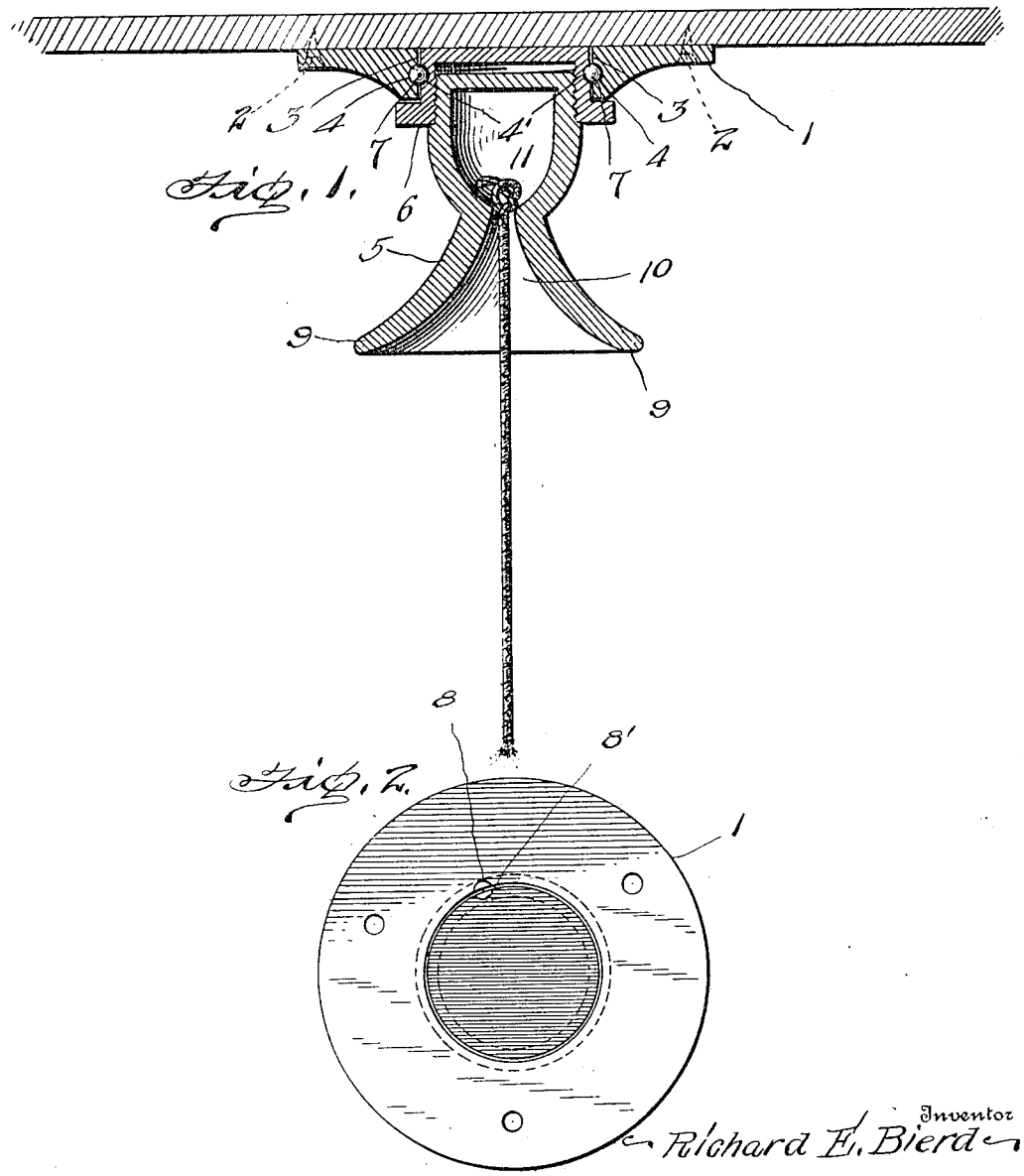
Witnesses
Jas A. G. Koehl.
L. Hilton
Inventor
Richard E. Bierd
By H. C. Wilson
Attorney dd
UNITED STATES PATENT OFFICE.

RICHARD E. BIERD, OF CARROLLTON, MICHIGAN.

PUNCHING-BAG SUPPORT.

No. 818,604.　　　　Specification of Letters Patent.　　　　Patented April 24, 1906.

Application filed May 11, 1905. Serial No. 260,053.

*To all whom it may concern:*

Be it known that I, RICHARD E. BIERD, a citizen of the United States, residing at Carrollton, in the county of Saginaw and State of Michigan, have invented certain new and useful Improvements in Punching-Bag Supports; and I do declare the following to be a full, clear, and exact description of the invention, such as will enable others skilled in the art to which it appertains to make and use the same.

This invention relates to punching-bag supports.

The object of the invention is to provide a support of this character in which provision is made for the free swiveling or turning of the bag-supporting member under the movements of the bag, thereby allowing the latter to swing with more freedom and with greater sensitiveness under the influences of the blows from the bag-puncher and at the same time obviating the twisting strain in the hanger ordinarily produced.

With this and other objects in view, which will appear as the nature of the invention is better understood, the invention consists of a punching-bag support embodying certain improved features of construction and combination and arrangement of parts, as will be hereinafter more fully described, and particularly pointed out in the appended claim.

In the accompanying drawings, Figure 1 is a central vertical section of a punching-bag support embodying my invention. Fig. 2 is a detail top plan view of the same, showing the opening for the introduction of the antifriction bearings into the raceway.

Referring now more particularly to the drawings, the numeral 1 represents an annular supporting-bracket adapted to be secured by screws or other suitable fastenings 2 to a suitable supporting-frame and tapered upon its under side to the opening therein to form a bearing-surface 3 of sufficient strength and area for the formation of an annular groove 4. Supported from this bracket is a bag suspending bell or hanger 5, which is threaded at its upper end for engagement with a flanged bearing-ring 6, having in its outer face a groove 4', facing the said groove 4 in the bracket, the said two grooves providing an annular raceway for a series of antifriction roller-balls 7, which adapt the bearing-ring and bag-suspending bell to swivel or rotate upon the supporting-bracket 1. In order to provide for the introduction of the balls into the raceway, the bracket and bearing-ring are formed with notches adapted to be brought into coincidence to form an opening of restricted area for the insertion of the balls, the size of the opening being such with respect to the diameter of the balls employed that the latter must be forced therethrough by a blow from a punch or suitable instrument, thus preventing the balls after they have been once inserted from becoming displaced or forcing their way out of the raceway.

The bag suspending bell or hanger 5 is provided with an outwardly-flaring abutment-flange 9 and a restricted throat or passage 10, leading from the under side thereof into a chamber or recess 11. The chamber or recess is adapted to receive the upper end of the bag suspending rod or rope, which is formed into a knot or provided with a stop disposed within said recess and of greater diameter than the passage 10 to secure the rope or rod against withdrawal. If desired, the flange may act as an abutment to limit the play of the bag, or it may be employed solely as a stop to limit the swing of the rope under the movement of the bag.

By the construction above described it will be seen that the bell or hanger is swiveled to turn or rotate upon the bracket 1, and thus is adapted to yield under the movements of the bag, thereby allowing the latter to swing with more freedom and with greater sensitiveness under the influences of the blows from the puncher and at the same time obviating the twisting strain on the hanger ordinarily produced.

Further advantages of this construction will be readily apparent to those versed in the art.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A punching-bag support, comprising a bracket-plate having a circular opening, a bearing-ring swiveled in said opening and having a screw-threaded socket, and a bag-suspending bell having its upper portion secured in the socket of said swiveled ring, substantially as described.

In testimony whereof I have hereunto set my hand in presence of two subscribing witnesses.

RICHARD E. BIERD.

Witnesses:
C. LINCOLN BENNETT,
EDWARD T. GRIGNARE.